(12) United States Patent
Santos et al.

(10) Patent No.: US 10,184,041 B2
(45) Date of Patent: Jan. 22, 2019

(54) GREEN COALESCENT AGENT COMPOSITION CONTAINING FATTY ACID MONOESTERS OF VEGETABLE OILS WITH FUSEL OIL ALCOHOLS

(75) Inventors: Juliane Pereira Santos, Santo Andre (BR); Emerson Barros Venceslau, Sao Paulo (BR); Fabio Rosa, Santo Andre (BR); Nadia Andrade Armelin, Sao Paulo (BR); Andre Luis Conde Da Silva, Sao Caetano do Sul (BR)

(73) Assignee: OXITENO S.A. INDUSTRIA E COMERCIO, Sao Paulo (BR)

( * ) Notice: Subject to any disclaimer, the term of this patent is extended or adjusted under 35 U.S.C. 154(b) by 171 days.

(21) Appl. No.: 14/122,626

(22) PCT Filed: May 16, 2012

(86) PCT No.: PCT/BR2012/000141
§ 371 (c)(1),
(2), (4) Date: Oct. 10, 2014

(87) PCT Pub. No.: WO2012/159180
PCT Pub. Date: Nov. 29, 2012

(65) Prior Publication Data
US 2015/0031813 A1    Jan. 29, 2015

(30) Foreign Application Priority Data

May 26, 2011 (BR) ..................... 1102427

(51) Int. Cl.
| | |
|---|---|
| *C08K 5/101* | (2006.01) |
| *C09D 11/00* | (2014.01) |
| *B01D 17/04* | (2006.01) |
| *C08K 5/05* | (2006.01) |
| *C09D 125/14* | (2006.01) |
| *C09J 125/14* | (2006.01) |
| *C09D 7/20* | (2018.01) |

(52) U.S. Cl.
CPC ............ *C08K 5/101* (2013.01); *B01D 17/047* (2013.01); *C08K 5/05* (2013.01); *C09D 7/20* (2018.01); *C09D 11/00* (2013.01); *C09D 125/14* (2013.01); *C09J 125/14* (2013.01)

(58) Field of Classification Search
CPC ....................................... C08K 5/101
See application file for complete search history.

(56) References Cited

U.S. PATENT DOCUMENTS

| | | | |
|---|---|---|---|
| 3,052,607 A * | 9/1962 | Hirsh ................. | A61K 8/342 514/552 |
| 6,797,753 B2 | 9/2004 | Benecke et al. | |
| 2010/0126384 A1* | 5/2010 | Bene .................. | C09D 7/06 106/243 |

FOREIGN PATENT DOCUMENTS

| | | | |
|---|---|---|---|
| BR | PI 0306043-8 A | 2/2005 | |
| BR | PI0111905-2 B1 | 12/2010 | |
| EP | 2327756 A2 * | 6/2011 | ............. C09D 7/001 |

* cited by examiner

*Primary Examiner* — Michael F Pepitone
(74) *Attorney, Agent, or Firm* — Jeffrey N. Townes; Cozen O'Connor

(57) ABSTRACT

The present invention is directed to compositions of green coalescents comprising monoesters obtained from direct or indirect esterification of vegetable oil fatty acids and fusel oil alcohols. The fatty acids used in the present invention have 6 to 22 carbon atoms and can be either saturated or unsaturated.

4 Claims, 1 Drawing Sheet

GREEN COALESCENT AGENT COMPOSITION CONTAINING FATTY ACID MONOESTERS OF VEGETABLE OILS WITH FUSEL OIL ALCOHOLS

CROSS-REFERENCE TO RELATED APPLICATIONS

This application is a national stage application, submitted under 35 U.S.C. § 371, of PCT Application No. PCT/BR2012/000141, filed on May 16, 2012, which claims priority to Brazilian Patent Application No. PI1102427-5, filed on May 26, 2011.

FIELD OF THE INVENTION

The present invention is directed to compositions of green coalescents comprising monoesters obtained from direct or indirect esterification of vegetable oil fatty acids and fusel oil alcohols. Fatty acids used in the present invention have 6 to 22 carbon atoms and can be either saturated or unsaturated.

BACKGROUND OF THE INVENTION

Coalescing agents are generally used in paints, varnishes and water-based adhesives. Coalescing agents act as a solvent and/or a plasticizer to the polymeric phase of paints, varnishes and adhesive formulations, diminishing the Tg thereof and favoring the formation of continuous and homogeneous films at several temperature and humidity conditions. Coalescing agents need to be stable in the presence of water and compatible with ingredients present in paints, varnishes and adhesive formulations. Specially, coalescing agents cannot destabilize polymer particles present in paints, varnishes and adhesive formulations. Coalescing agents should also be sufficiently volatile to be eliminated during drying of films, preferably after water evaporation.

The plasticization power of a coalescing agent, that is, the ability thereof in diminishing Tg of a polymer, depends on solubility parameters of the coalescent and the polymer. Usually, water-insoluble coalescing agents having solubility parameters that are compatible with those of the polymer to be plasticized are more effective in reducing MFFT than water-soluble coalescing agents.

Currently, there is an increasing need for coalescing agents that meet the environmental legislation that controls emission of volatile organic compounds (VOC) to the atmosphere. According to European Directive legislation 2004/42/CE coalescing agents having a boiling point of less than 250° C. are considered volatile organic compounds. Other features of coalescing agents that are valuable to manufacturers of paints, adhesives and varnishes and for the final consumer are: low odour, HAP-free, renewable raw material-derived coalescents having high vegetalization index and low $CO_2$ emission during the manufacture process.

Several molecules having alcohol and/or ester functionality are used as a coalescing agent. Butyl glycol (Dow and Oxiteno), 2,2,4-trimethyl-1,3-pentanediol monoisobutyrate (Texanol from Eastman Kodak) monoethylene glycol phenyl ether (Dow, Oxiteno) are the molecules most used as coalescents. Due to its boiling point of 169-173° C. butyl glycol is considered a VOC by the European Legislation. Texanol, which has a boiling point of around 254° C. is not considered a VOC by the European Legislation. Nevertheless, Texanol is not derived from renewable raw material.

Patent literature contemplates only a few reports mentioning the use of fusel oil-derived esters as coalescing agents and/or plasticizers.

US patent application US2009/0198002 A1 to Rhodia INC entitled "Low VOC Coalescing Agents", describes the use of diesters of adipic, glutaric and succinic acids and alcohols comprising a hydrocarbon chain having 4 to 8 carbon atoms, including alcohols from fusel oil. Diesters obtained from glycol ethers and diacids are also encompassed in the invention.

Based on the aforementioned patent example, one notes that the use of fusel oil-derived esters (US2009/0198002 A1) has been little explored. In addition, molecules described by Rhodia in application US2009/0198002 A1 are diesters from diacids and fusel oil. Accordingly, it is evident that monoesters of vegetable oil fatty acids and fusel oil alcohols have not been explored so far.

SUMMARY OF THE INVENTION

The present invention relates to the use of green coalescents obtained from an esterification reaction of fusel oil alcohols and vegetable oil fatty acids. Fatty acids used in the present invention have 6 to 22 carbon atoms and can be saturated or unsaturated.

In particular, the present invention provides a composition of green coalescents comprising monoesters obtained from direct or indirect esterification of vegetable oil fatty acids and fusel oil alcohols.

DETAILED DESCRIPTION OF THE INVENTION

The present invention describes the use of coalescing agents and/or plasticizers comprising monoesters of fusel oil alcohols and vegetable oil fatty acids.

In the present invention, the terms "coalescing agents" and "coalescent" refer to solvents capable of reducing MFFT (minimum film forming temperature), that is, acting as a plasticiser for the polymeric phase.

The coalescing agents listed in the present invention can be used in the formulation of paints, adhesives and varnishes containing latexes or polymer dispersions. Preferably, latexes are selected from: styrene-butyl acrylate, styrene-butyl acrylate-acrylic acid, styrene-butyl acrylate-methacrylic acid, styrene-butadiene, styrene-butadiene-acrylic acid, styrene-butadiene-methacrylic acid, acrylonitrile-butadiene, acrylonitrile-butadiene-acrylic acid, acrylonitrile-butadiene-methacrylic acid, polyacrylates, polyacrylates-acrylic acid, polyacrylates-methacrylic acid, polyacrylates-carboxylic acids in a general manner and polyvinyl acetate.

The coalescing agents mentioned herein can also be used in civil construction, architectural paints, industrial paints, original paints, automotive repaints, paints and varnishes for packages in general.

Preferably, the concentration of fusel oil monoesters and vegetable oil fatty acids in formulations of paints, adhesives and varnishes and latexes can range between 0.1 and 50% in relation to the polymer content present in the formulations or latexes.

Said coalescing agents are preferably suitable for polymeric dispersions in water and formulations containing such dispersions.

Coalescing agents of the present invention are monoesters derived from fusel oil having a boiling point of greater than 250° C.

The ability of coalescing agents in plasticizing polymer particles, that is, in diminishing wet Tg of polymers has been monitored via MFFT assays of latex films comprising 2 mass % of the coalescing agents.

Wet abrasion resistance of coalescing agents-containing paint films has been monitored via washability tests.

Preferably, in the composition in accordance with the invention, alcohols derived from fusel oil have 4 to 5 carbon atoms.

Preferably, in the composition in accordance with the invention, green coalescents are derived from renewable raw material.

The invention will now be described by means of the following examples, which are merely exemplary and should not be construed as a limitation on the scope of the invention.

EXAMPLE 1

Effect of Different Coalescing Agents on MFFT of Styrene-Acrylic Latex Films

Figure 1:
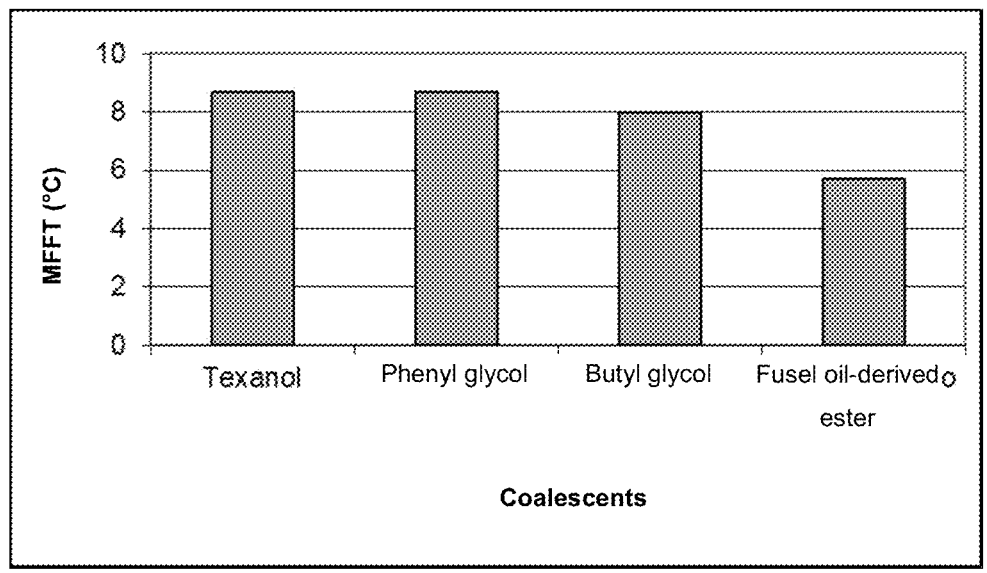
FIG. 1 depicts MFFT results of styene-acrylic latex, MFFT of about 18° C., comprising 2 mass % of the fusel oil ester of the present invention, butyl glycol, phenyl glycol, and Texanol.

FIG. 1 depicts MFFT results of styrene-acrylic latex, MFFT of about 18° C., comprising 2 mass % of the fusel oil ester of the present invention, butyl glycol, phenyl glycol and Texanol.

MFFT results suggest that the fusel oil-derived ester has greater ability in plasticizing polymer particles than the further coalescing agents evaluated.

EXAMPLE 2

Boiling Point e Volatile Content of Coalescing Agents

Boiling points of the coalescing agents of FIG. 1 are set forth in Table 1. According to Table 1, the fusel oil ester has higher boiling point than the remaining coalescing agents of FIG. 1. The boiling point of the fusel oil ester is not considered to be a VOC by the European Directive legislation 2004/42/CE.

TABLE 1

Boiling point of the fusel oil-derived ester, Texanol and phenyl glycol.

| Molecules | Boiling point (° C.) |
|---|---|
| Fusel oil-derived ester | 260 |
| Texanol | 254 |
| Phenyl glycol | 240-250 |

EXAMPLE 3

Figure 2:
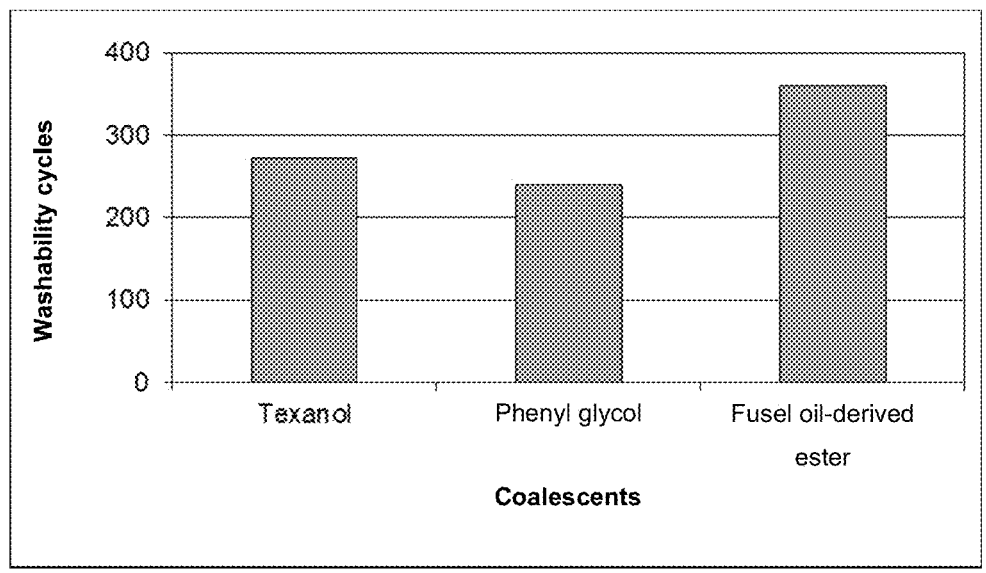
FIG. 2 depicts the washability results obtained for opaque paints described in Table 2 containing the green coalescent, phenyl glycol, and Texanol.

Results of Wet Abrasion Resistance of Paint Films Comprising Different Coalescing Agents Washability results obtained for opaque paints described in Table 2 containing the green coalescent, phenyl glycol and Texanol are depicted in FIG. 2.

| Items | Components | Mass (g) |
|---|---|---|
| 1 | Drinking water | 20.00 |
| 2 | Sodium nitrite | 0.05 |
| 3 | Sodium tetrapyrophosphate | 0.02 |
| 4 | Hydroxyethylcellulose | 0.25 |
| 5 | Monoethanolamine | 0.05 |
| 6 | Ultrasperse PA 44 | 0.35 |
| 7 | Ultrol L 10 | 0.35 |
| 8 | Anti-foaming | 0.10 |
| 9 | Bactericide | 0.15 |
| 10 | Fungicide | 0.15 |
| 11 | Titanium dioxide | 15.00 |
| 12 | Kaolin | 4.00 |
| 13 | Natural calcium carbonate | 5.00 |
| 14 | Precipitated calcium carbonate | 8.00 |
| 15 | Agalmatolite | 4.00 |
| 16 | Styrene-acrylic latex (MFFT ~18° C.) | 20.00 |
| 17 | Anti-foaming | 0.15 |
| 18 | Coalescing agent (described in Table 3) | 1.20 |
| 19 | MEA | 0.15 |
| 20 | Primal RM-5 | 1.20 |
| 21 | Primal TT 935 | 0.40 |
| 22 | Drinking water | 19.43 |
| | Total mass of paint with coalescing agent | 100.00 |

Washability results suggest that opaque paint films containing the green coalescent of the present invention, a fusel oil-derived ester, are more resistant to wet abrasion than opaque paint films containing Texanol and phenyl glycol.

The invention claimed is:

1. A composition, comprising a water-based coating composition comprising green coalescents, wherein the green coalescents comprise monoesters obtained from direct or indirect esterification of vegetable oil fatty acids having from 6 to 22 carbon atoms and fusel oil alcohols having from 4 to 5 carbon atoms, wherein the water-based coating composition comprising the green coalescents further comprises paints, adhesives, and varnishes containing latexes or polymer dispersions.

2. The composition of claim 1, wherein the latexes are selected from the group consisting of: styrene-butyl acrylate, styrene-butyl acrylate-acrylic acid, styrene-butyl acrylate-methacrylic acid, styrene-butadiene, styrene-butadiene-acrylic acid, styrene-butadiene -methacrylic acid, acrylonitrile-butadiene, acrylonitrile-butadiene-acrylic acid, acrylonitrile-butadiene-methacrylic acid, polyacrylates, polyacrylates-acrylic acid, polyacrylates-methacrylic acid, polyacrylates-carboxylic acids and polyvinyl acetate.

3. The composition of claim 1, wherein the water-based coating composition is used in civil construction, architectural paints, industrial paints, original paints, automotive repaints, or paints and varnishes for packages.

4. The composition of claim 1, wherein the concentration of the green coalescents in water-based coating compositions comprising paints, adhesives, varnishes, and latexes ranges from 0.1 to 50% in relation to the polymer content present in the water-based coating composition.

* * * * *